United States Patent [19]

Schaefer

[11] 3,757,612
[45] Sept. 11, 1973

[54] TRANSMISSION AND CONTROLS
[75] Inventor: Robert H. Schaefer, Westfield, Ind.
[73] Assignee: General Motors Corporation, Detroit, Mich.
[22] Filed: Mar. 24, 1971
[21] Appl. No.: 127,530

[52] U.S. Cl................... 74/865, 74/501 R, 251/263, 251/294, 251/321
[51] Int. Cl. ... B60k 21/00, F16c 1/12, F16k 31/524
[58] Field of Search...................... 74/865, 867, 868, 74/869, 110, 501 R, 501 P, 501 M; 251/263, 294, 321

[56] References Cited
UNITED STATES PATENTS

| | | | |
|---|---|---|---|
| 1,936,191 | 11/1933 | Evans............................... | 74/501 X |
| 2,326,138 | 8/1943 | Grant, Jr............................. | 74/110 |
| 2,352,212 | 6/1944 | Lang et al............................ | 74/865 |
| 2,617,626 | 11/1952 | Calkins............................ | 251/294 X |
| 2,648,518 | 8/1953 | Curtis............................ | 251/294 X |
| 2,740,304 | 4/1956 | Sheppard............................ | 74/868 |
| 3,036,476 | 5/1962 | Klepper............................ | 74/501 X |
| 3,080,768 | 3/1963 | Jania.................................. | 74/869 |
| 3,253,480 | 5/1966 | Fernberg............................. | 74/501 |

Primary Examiner—Charles J. Myhre
Assistant Examiner—Thomas C. Perry
Attorney—W. E. Finken and A. M. Heiter

[57] ABSTRACT

A transmission controlled by a combustion engine torque demand or fuel feed control member which is connected by a linkage to move a cam actuator and cam follower which actuates a torque demand pressure regulator valve proportional to the movement of the fuel feed member to provide a torque demand pressure uniformly proportional to engine torque. A support housing is rotatably mounted in an aperture in a wall of the transmission housing for rotation about the axis of the cam follower and the cam actuator is reciprocably mounted on the support housing on an axis perpendicular to the axis of the cam follower. The support housing rotates about its axis so that swinging movement of the connecting linkage is accommodated by rotation of the support housing for accurate transmittal of the torque demand signal from the fuel feed control to the cam actuator and follower without binding or strain. The cam actuator has a profile so that its movement uniformly proportional to fuel feed provides in the cam follower movement uniformly proportional to engine torque.

9 Claims, 3 Drawing Figures

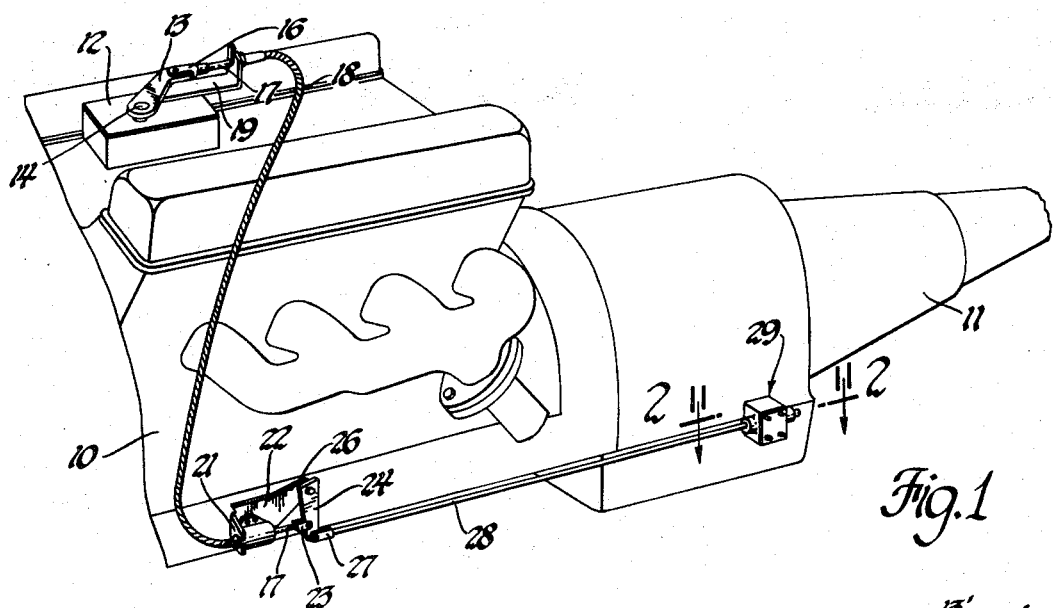
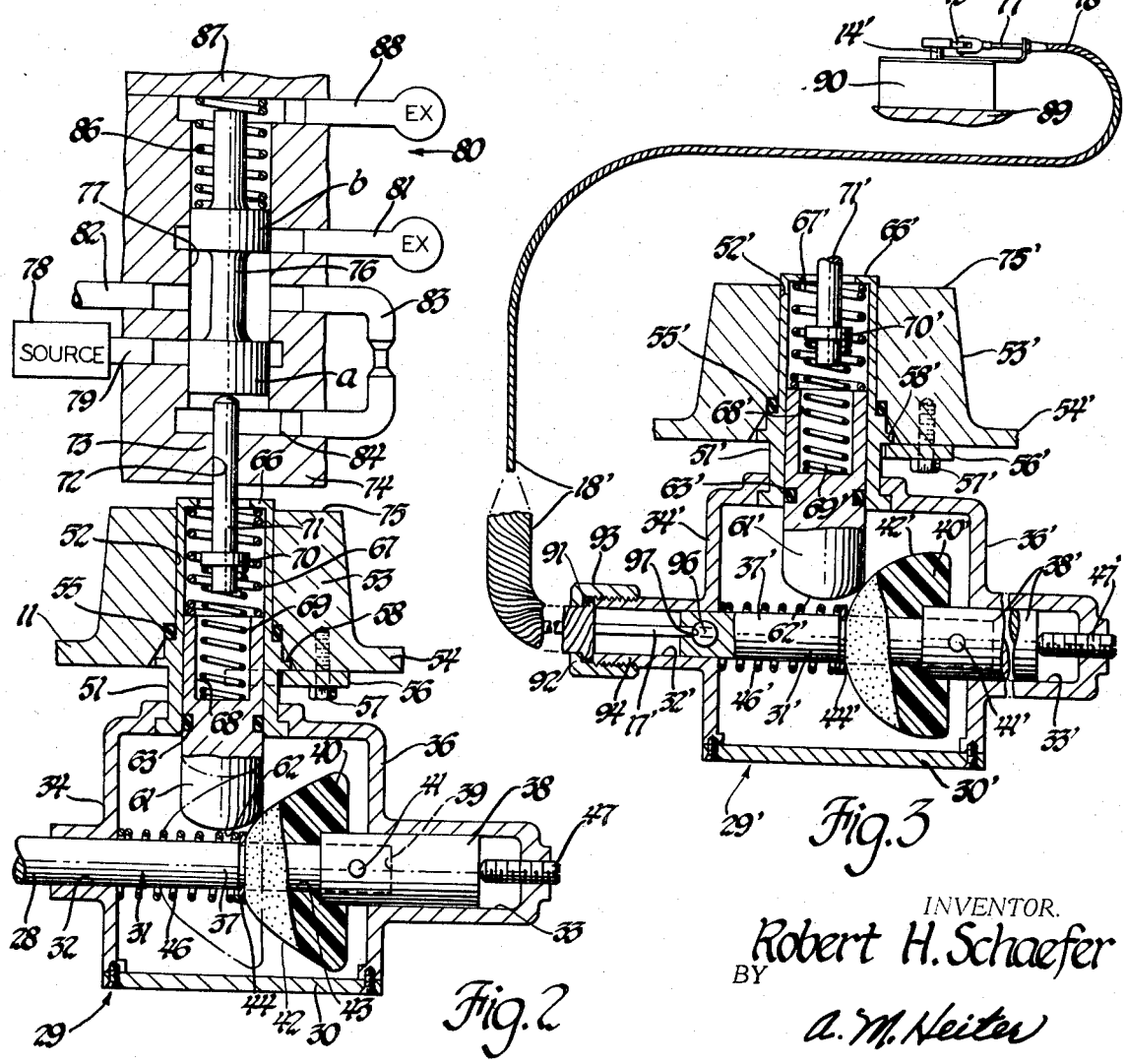
Fig.1
Fig.2
Fig.3
INVENTOR.
Robert H. Schaefer
BY
a. M. Neiter
ATTORNEY

TRANSMISSION AND CONTROLS

This invention relates to power shift transmissions and controls.

In power shift transmissions the transmission control system includes a control mechanism responsive to the torque demand on the engine. The torque demand is proportional to the position of an engine fuel feed control member; such as the throttle lever which controls the speed spring of a speed governor controlling the rack of a diesel engine injection fuel feed mechanism or the throttle lever of a carburetor feed engine. The fuel feed control member is connected to the transmission torque demand control mechanism, such as a pressure regulator valve, in the transmission. The linkages employed, sheathed cable linkages or rod and lever linkages, have some limited swinging or transverse movement while transmitting reciprocal movement. In order to accommodate this transverse movement, while accurately transmitting the torque demand movement without strain on the mechanism, a rotary support housing is mounted on a wall of the transmission housing for rotation about an axis and has a coaxial bore in which a cam follower member is reciprocably mounted. The cam actuator member is reciprocably mounted in the support housing for reciprocal movement on an axis transverse to the axis of rotation of the support housing and cam follower member so that swinging movement of the control linkage is accommodated by free rotation of the rotary support housing for accurate transmittal of the torque demand signal from the engine fuel feed member to the transmission torque demand mechanism without straining the mechanism. The profile of the cam is contoured so the cam follower moves uniformly proportional to engine torque in response to cam actuator member movement uniformly proportional to fuel feed control member movement.

An object of the invention is to provide an improved signal transmitting linkage for a transmission having a rotary support member mounted on a fixed transmission housing for rotation about an axis, a cam follower member movably mounted on the rotary support member and extending into the fixed transmission housing, a cam actuator member mounted on the rotary support member for movement transverse with respect to the axis of rotation of said rotary support member and a linkage mechanism connecting the cam actuator member to a fuel feed control member for transmitting reciprocating movement and having some lateral movement which is accommodated by rotation of the rotary support member.

Another object of the invention is to provide an improved signal transmitting linkage system from a sending member on an engine moving to a control fuel feed to a receiving member on a transmission having a rotary support housing mounted on the fixed transmission housing for rotation about an axis, a cam follower member reciprocably mounted on the rotary support housing and extending into the stationary housing on the axis of rotation of the rotary support housing, a cam actuator member mounted on the rotary support housing for movement transverse with respect to the cam follower member and a linkage mechanism connecting said sending member to said cam actuator member for transmitting reciprocating movement proportional to movement of said sending member to said cam member and said linkage mechanism having some lateral movement which is accommodated by rotation of the rotary support housing.

Another object of the invention is to provide an improved signal transmitting linkage system for transmitting a signal proportional to movement of a sending member to a receiving member having a fixed support, a movable sending member on said fixed support, a rotary support member rotatably mounted on the fixed support for rotation about an axis, a cam follower receiving member reciprocably mounted on the rotary support member on the axis of rotation of the rotary support member, a cam actuator member mounted on the rotary support member for movement transverse with respect to the cam follower receiver member and a linkage mechanism connecting said sending member to said cam actuator member for transmitting sending member movement as reciprocating movement and having some lateral movement which is accommodated by rotation of the rotary support housing so said cam actuator member accurately moves said cam follower receiving member in relation to said sending member.

Another object of the invention is to provide an improved signal transmitting linkage system for a transmission for transmitting from a sending member moving in uniform proportion to movement of an engine fuel feed control member, a signal to a transmission control receiving member having a uniform proportional relation to engine torque, having a linkage connecting said sending member to a cam actuator member to move the cam actuator member in a uniform proportion relative to movement of said sending member throughout a major portion of the fuel feed range and having a contour having the same relation to a uniform rate of change that movement of the fuel feed sending member has to engine torque to move the cam follower member uniformly proportional to engine torque.

These and other objects of the invention will be more apparent from the following description and drawing.

FIG. 1 illustrates the Applicant's power train including the engine transmission and the torque demand control mechanism.

FIG. 2 is an enlargement of the section 2—2 of FIG. 1 showing the details of the throttle pressure regulator valve and the cam mechanism.

FIG. 3 is a similar partial sectional view of a modification.

As shown in FIG. 1, a diesel engine 10 drives a conventional multiratio power shift transmission 11, which may be as shown in the applicant's application Ser. No. 852,774, U.S. Pat. No. 3,587,355, issued June 28, 1971 or the Robert H. Schaefer and Joseph R. Fox application Ser. No. 852,760, continued as Ser. No. 138,655, now U.S. Pat. No. 3,691,872 granted Sept. 19, 1972.

The engine has a fuel feed control mechanism 12 which may be of the type shown in the Frick et al. U.S. Pat. 3,014,475 issued Dec. 6, 1961, which has a throttle lever 13 rotatably mounted on a shaft 14 like lever assembly 48 and shaft 49 of the above Frick patent. The lever 13 rotates proportional to throttle or fuel feed control member movement which controls the speeder spring of a speed governor controlling fuel feed rack movement where the rack controls the fuel feed of the injectors to provide between upper and lower speed limits an engine speed and torque uniformly proportional to throttle movement. However, in some engines the torque rise wil not be uniformly proportional to speed but will increase less than speed at high speeds.

The lever 13 is connected by a suitable clevis pivot member 16 to the cable 17 which extends through the sheath 18 which is secured by a bracket 19 to the fuel feed mechanism 12 on engine 10. The other end of the sheath 18 is secured by the arm 21 of bracket 22 secured to the engine and the cable 17 extending therefrom is connected by the clevis pivot member 23 to a lever 24 pivotally mounted on the arm 26 and bracket 22. The lever 24 is also pivotally connected by the clevis pivot 27 to the rod 28 which extends into the rotary support housing 29 which is shown in detail in FIG. 2. The housing has a box shape with a cover 30 removably secured and sealed thereto.

The rod 28 has an integral or attached end portion 27 forming part of the cam slide assembly 31 reciprocably mounted in aligned bearing bores 32 and 33 in opposite side walls 34 and 36 of the rotary housing 29. The actuator cam slide assembly 31 has rod portion 37 slidably mounted in the bearing bore 32 and a large diameter rod portion 38 slidably mounted in the bearing bore 33. Large diameter rod portion 38 has a counter-bore 39 to receive the end of the rod portion 37 which is secured thereto by pin 41. The cam actuator member 40 has a surface 42 and a central stepped bore 43 with the small portion fitting rod portion 37 and the larger portion fitting the larger diameter of rod portion 38. The rod portion 38 provides a shoulder locating the cam actuator member 40 on one side and the snap ring 44 secured in a groove in rod portion 37 locates the cam actuator member on the other side to axially fix the cam actuator member to fix it to rod portions 37 and 38 to form the cam slide assembly 31. A spring 46 is located between the housing wall 34 and the snap ring 44 to resiliently bias the cam member 40 and cam slide assembly 31 to the low throttle position against the adjustable stop screw 47 which may adjust the zero throttle position of the cam slide assembly.

The rotary support housing 29 has a sleeve portion 51 which extends into a bore 52 in the boss portion 53 on a wall 54 of the housing of transmission 11. This sleeve 51 is sealed by a seal 55 and axially secured for rotation by the semicircular retainer member 56 secured by suitable screw fasteners 57 to the boss portion 53. The retainer member engages a shoulder 58 on the outside surface of the sleeve 51. A cam follower member 61 with a suitable rounded nose portion 62 engaging the cam member 42 is slidably reciprocably mounted in the bore of sleeve 51. The seal 63 between the cam follower and sleeve 51 prevents transfer of lubricant between the transmission housing and the rotary support housing 29. The inner end of the sleeve 51 has an internal spring abutment 66 for a return spring 67 which is located inside sleeve 51 and engages the cam follower 61 and urges it continuously into contact with the cam 40. Cam follower 61 also has a counter-bore 68 providing a guide and seat for actuator spring 69 which engages a shoulder 70 on pin 71 reciprocably mounted in the bore 72 in the end wall 73 of the valve body 74. The inner end of bore 52 and the outer end of bore 72 are vented by the exhaust space 75 between the boss portion and the valve body. The valve body 74 is secured to another wall or partition portion of the transmission housing.

The torque demand pressure regulator valve 80 has a valve element 76 having lands $a$ and $b$ of equal diameter located in a bore 77 in the valve body. In the central position shown a suitable source 78, consisting of a pump and regulator valve, supplies fluid at a regulated pressure to main line 79 which is connected to the bore 77 and just blocked by the inner edge of land $a$. The exhaust port 81 is just blocked by the inner edge of land $b$. The torque demand pressure line 82 is connected to bore 77 centrally between lands $a$ and $b$ and by a restricted branch 83 to the chamber 84 between wall 73 and land $a$. A spring 86 seated on valve body end wall 87 abuts land $b$. The spring chamber portion of bore 77 beyond land $b$ is vented by exhaust 88.

When the lever 13 moves from the zero throttle or fuel feed control member position shown in FIGS. 1 and 2, the lever 13 moves counterclockwise as viewed, pulling on cable 17 in the fixed sheath 18 to rotate lever 24 clockwise and pull on rod 28 to move cam 40 to the left. Movement of cam 40 compresses return spring 46 and moves cam follower 61 inwardly against the compression of return spring 67 and at the same time compressing actuator spring 69 to transmit a force to pin 71 increasing in proportion to cam follower movement. The pin 71 transmits this force to the valve element 76 to act with the regulated torque demand pressure in chamber 84 to bias the valve element against the opposing bias of biasing spring 86 to provide a torque demand pressure inversely proportional to the force on pin 71 and thus to fuel feed or torque demand. Since the torque demand pressure in chamber 84 acts on pin 71 in opposition to the force of spring 69 a small initial portion of the torque demand pressure is constant so the pressure curve is flat.

The lands $a$ and $b$ of valve element 76 are spaced apart the same distance as the ports of main line 79 and exhaust 81 and just block both ports in a central position so the regulating movement is very small, mere dithering, so the position of pin 71 does not have any significant movement which would affect the action of spring 69 so the force provided by this spring is solely provided by the position of cam follower 62 as controlled by cam 40.

The surface 42 of cam 40 is a surface of revolution so the rotary position of cam 40 and rod 37 about its axis is not critical. Diesel engines generally have a torque output linearly related to throttle member movement and between speed governor control limits to fuel rack position or fuel feed. Thus, the cam 40 may have a straight line surface 42 engaging the cam follower so the cam follower moves in a linear relation to the fuel feed lever 13. In diesel engines where the torque does not increase linearly with throttle or fuel feed member movement the cam surface 42 would depart from a straight line in the same relation that engine torque differs from fuel feed member movement. Thus in engines where the increase in torque falls off at higher fuel feed member positions, the cam surface 42 would be a straight line at low fuel feed values and curve lower than the straight line at high fuel feed values.

FIG. 3 shows a modification of the linkage control for actuating a regulator valve 80 of a transmission control system with like parts having the same reference numerals primed. In this modification, an internal combustion engine 89 having a carburetor 90 with a throttle control or fuel feed control lever 13' fixed to a shaft 14' connected to the carburetor throttle valve. The cable 17' in sheath 18' connects lever 13' to rod portion 37'. The sheathed cable like the rod 28 has some swinging or lateral movement during operation and the rotary support housing 29' similarly swings to provide proper operation of the sheathed cable for actuating cam 40'. The sheath 18' has a shoulder 91 at the end which is clamped by shoulder 92 of threaded sleeve 93 threadably fastened on the external surface of bearing sleeve portion 94 of housing 29'. The cable 17' has an enlarged end 96 inserted in a securing slot 97 in the end of rod portion 37' to secure the cable to this rod portion. The movement of lever 13' is directly transferred to rod portion 37' and cam 40' and provides operation as described above.

Carburetor controlled internal combustion engines provide a larger increase in engine torque relative to throttle opening at low throttle openings than at high throttle openings. As compared to linear movement of the throttle lever 13' the engine torque would increase rapidly at the lowest throttle opening and thereafter increase less rapidly or at a gradually reduced rate of increase as the throttle is opened to wide open position. When plotted against throttle opening, the engine torque curve would have a parabolic or similar curve like cam surface 42'. The curve of surface 42' has a relation to a straight line like the engine torque curve is related to throttle opening or fuel feed member movement so while the lever 13' moves with throttle opening and cam 40' moves uniformly proportional to throttle opening the cam follower moves proportional to engine torque to provide a torque demand signal substantially proportional to engine torque.

It will be appreciated that other modifications of the invention described in the claims may be made.

What is claimed is:

1. In a transmission, a transmission housing having a wall member with an opening therein, multiple torque ratio drive means providing a plurality of torque ratio drives and having control means for selectively establishing said torque ratio drives and including torque demand signal means providing a torque demand signal for controlling said control means located in said housing, fuel feed control means including a fuel feed control element moving proportional to fuel feed, cam means including a support member mounted on said housing wall for rotation about an axis and located outside of said housing, cam follower means mounted for reciprocation relative to said members and extending through said opening in said housing wall member along said axis, cam actuator means mounted on said support member for reciprocation transverse to said axis and contacting said cam follower means to reciprocate said cam follower means in response to reciprocation of said cam actuator means with the same relationship regardless of the rotary position of said support member and a linkage connected to said fuel feed control element and said cam actuator means to move said cam actuator means in proportion to movement of said fuel feed element and lateral movement of said linkage being accommodated by rotation of said support member to relieve strain on said linkage and cam means.

2. The invention defined in claim 1 and said cam follower means being mounted for reciprocation on said support member.

3. The invention defined in claim 2 and said support member having a sleeve pivotally mounted in said opening in said housing wall member and said cam follower being reciprocably mounted in said sleeve.

4. In a transmission, a transmission housing having a wall with an opening therein, multiple torque ratio drive means providing a plurality of torque ratio drives and having control means for selectively establishing said torque ratio drives and including torque demand signal means providing a torque demand signal for controlling said control means located in said housing, fuel feed control means including a fuel feed control member moving proportional to fuel feed, a support member having a housing and a sleeve with the sleeve mounted for rotation in said opening in said housing wall for rotation without axial movement about an axis to rotatably support said support housing outside of said transmission housing, a cam follower member mounted in said sleeve for reciprocation relative to said sleeve and extending into said housing wall along said axis, said sleeve at its free end inside said transmission housing having an internal shoulder, a spring between said shoulder and cam follower, a cam actuator member mounted in said support housing for reciprocation transverse to said axis and contacting said cam follower member to reciprocate said cam follower member in response to reciprocation of said cam actuator member with the same relationship regardless of the rotary position of said support member and linkage connected to said fuel feed control member and said cam actuator member to move said cam actuator member in proportion to movement of said fuel feed member and lateral movement of said linkage being accommodated by rotation of said support member to relieve strain on said linkage cam actuator member and cam follower member.

5. The invention defined in claim 4 and said fuel feed control member being a pivoted lever and said linkage being a rigid rod pivoted to and reciprocated by said lever and slidably mounted in said support housing transverse to said axis.

6. The invention defined in claim 4 and said linkage being a sheathed cable connecting said fuel feed member to said cam actuator member to reciprocate said cam actuator member.

7. In a transmission; a torque demand control member for an engine movable uniformly proportional to fuel feed on the engine providing torque in a predetermined non-uniform proportion to fuel feed movement, a multiratio gear transmission providing a plurality of ratio drives and having power shift control means including torque demand responsive control means for shifting to selectively establishing a plurality of ratio drives, said transmission including a housing having a wall with aperture therein, a support member having a sleeve rotatably mounted in said aperture in said transmission housing wall adjacent said aperture, a cam follower member reciprocably mounted in said sleeve of said support member and operatively connected to said torque demand responsive control means, a cam actuator member reciprocably mounted on said support member transversely to the axis of said cam follower member, said cam actuator member and said cam follower member having cam surfaces converting fuel feed movement of said cam actuator member to movement of said cam follower member proportional to engine torque, linkage means having reciprocating and lateral movement connecting said torque demand control member to said cam actuator member to reciprocate said cam actuator member in response to movement of said torque demand control member and said cam follower member and support member rotating to permit rotary movement of said support member while maintaining the same relationship between said cam actuator member and cam follower member for accurate transmittal of the motion of said torque demand control member to said cam follower member and torque demand responsive control means.

8. In a control, a controlling member movable proportional to a control function, controlled means providing a signal proportional to a force, a housing for the controlled means having a wall with aperture therein, a support member rotatably mounted on said housing wall concentric with said aperture, a cam follower member rotatably and reciprocably mounted in said support member coaxial with the axis of rotation of said support member operatively connected to said controlled means to apply a force to said controlled means proportional to movement of said cam follower member, a cam actuator member reciprocably mounted on said support member transverse to the axis of said support member operatively engaged with said cam follower member to reciprocate said cam follower member in response to reciprocation of said cam actuator member, linkage means having reciprocating and lateral movement connecting said controlling member to said cam actuator member to reciprocate said cam actuator member in response to movement of said controlling member and said cam actuator member and support member rotating to permit rotary movement of the linkage means about the axis of said cam follower member and support member for accommodating said lateral movement while maintaining the same relationship between said cam actuator member and cam follower member for accurate transmittal of the movement of the controlling member function.

9. In a control, a controlling member movable proportional to a control function, controlled means for providing a signal varying with said control function, support means including a fixed support member and a rotatable support member rotatably mounted on said fixed support member for rotation about an axis to a plurality of rotary positions, said controlled means having cam follower means mounted on said support means for reciprocation axially with the axis of rotation of said rotary support member operative to cause said controlled means to provide a signal varying as a function of movement of said cam follower means, cam actuator means reciprocably mounted on said rotary support member for reciprocal movement transverse to said axis of said rotary support member operatively engaging said cam follower means to reciprocate said cam follower means in response to reciprocation of said cam actuator means in the same functional relation in said plurality of rotary positions and rotatable with said rotary support member, linkage means having reciprocating and lateral movement connecting said controlling member to said cam actuator means to reciprocate said cam actuator means in response to movement of said controlling member, said cam actuator means and said rotary support member rotating to permit rotary movement of a portion of said linkage means about the axis of said rotary support member to accommodate said lateral movement while maintaining the same relationship between said cam actuator means and cam follower means for accurate transmittal of the movement of the controlling member function to said controlled means.

* * * * *

PO-1050
(5/69)

UNITED STATES PATENT OFFICE
CERTIFICATE OF CORRECTION

Patent No. 3,757,612     Dated September 11, 1973

Inventor(s) Robert H. Schaefer

It is certified that error appears in the above-identified patent and that said Letters Patent are hereby corrected as shown below:

In the Specification: Column 3, line 16, numeral "27" should be -- 37 --.

Signed and sealed this 12th day of March 1974.

(SEAL)
Attest:

EDWARD M. FLETCHER, JR.
Attesting Officer

C. MARSHALL DANN
Commissioner of Patents